2,778,248
BAND SAW SETTING AND FILING CLAMP
Bartell T. Jeppesen, Lynwood, Calif.
Application April 26, 1954, Serial No. 425,348
5 Claims. (Cl. 76—73)

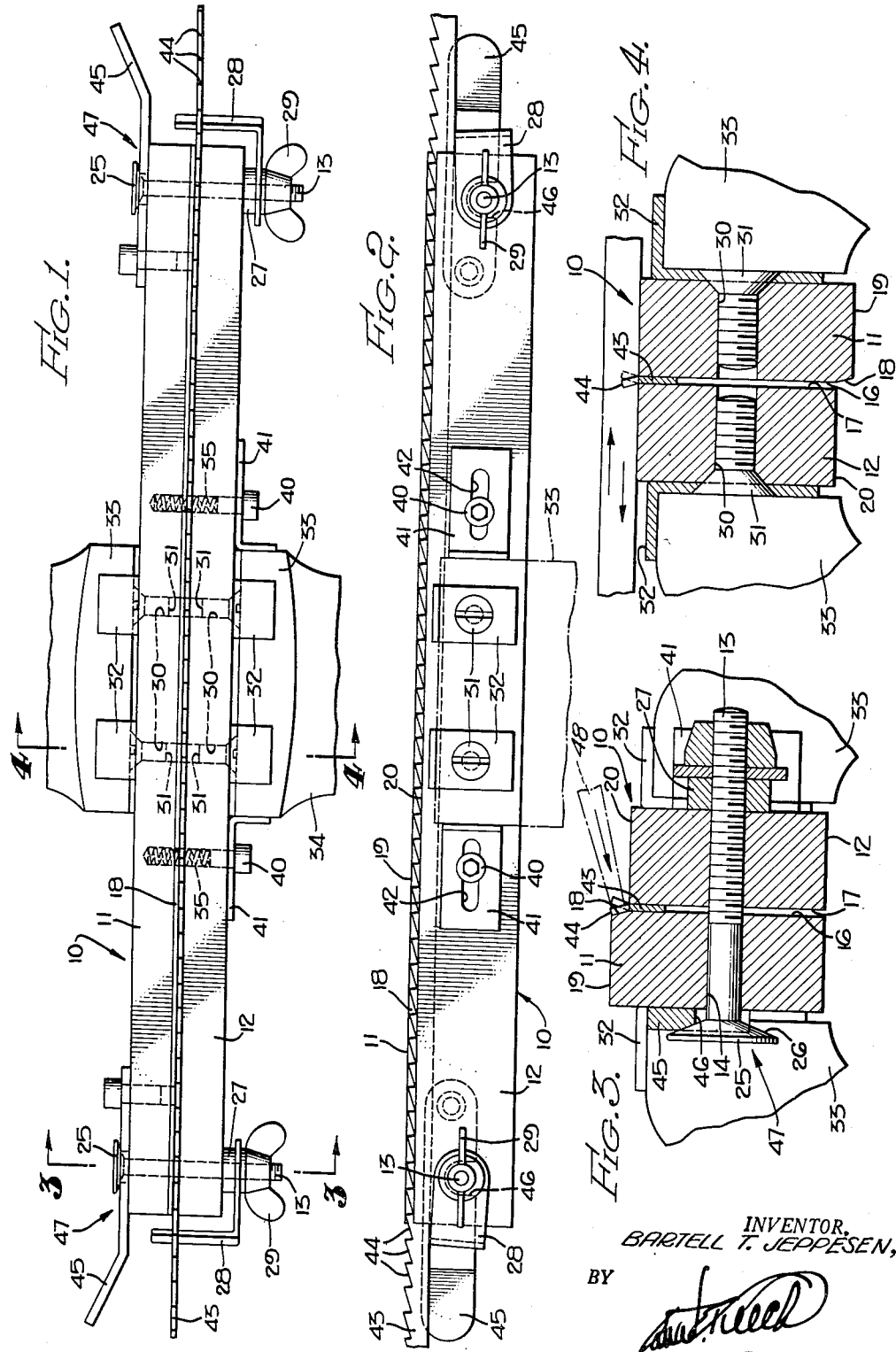
Jan. 22, 1957  B. T. JEPPESEN  2,778,248
BAND SAW SETTING AND FILING CLAMP
Filed April 26, 1954
INVENTOR.
BARTELL T. JEPPESEN,
BY
ATTORNEY United States Patent Office 2,778,248
Patented Jan. 22, 1957

This invention relates to clamps adapted to facilitate the setting and filing of the teeth of band saws.

Clamps for this general purpose are of course old and well known, the clamps of the prior art embodying within themselves a means for mounting them on a bench and a mechanism for effecting the entire clamping action of the device.

Nearly every shop in which saw filing is done however includes a substantial bench vise.

It is an object of the present invention to provide a band saw setting and filing clamp which will fit onto an ordinary bench vise and utilize the clamping action of said vise in gripping the saw.

Another object of the invention is to provide a vise attachment of this character which is adapted to serve as a saw setting clamp when placed in the vise in one position and a saw filing clamp when placed in the vise in a second position in inverted relation to the first position.

It is a further object of the invention to provide a vise attachment as aforesaid constituting an effective means for setting and filing a band saw and which is simple in construction and relatively inexpensive to manufacture.

The manner of accomplishing the foregoing objects as well as further objects and advantages will be made manifest in the following description taken in connection with the accompanying drawings in which Fig. 1 is a plan view of a preferred embodiment of the invention with a band saw clamped therein and positioned as for setting the teeth of said saw.

Fig. 2 is a side elevational view of Fig. 1.

Fig. 3 is an enlarged cross sectional view on the line 3—3 of Fig. 1 and illustrates the manner of setting a tooth of the saw.

Fig. 4 is an enlarged cross sectional view taken on line 4—4 of Fig. 1 and with the device inverted and the saw clamped therein for filing said saw.

Referring specifically to the drawings, the clamp 10 of the invention there illustrated includes a pair of bars 11 and 12 which are assembled in parallel closely spaced relation on threaded bolts 13. These bolts extend freely through holes 14 in bar 11 and are screwed through tapped holes 15 in bar 12, so that longitudinal edge faces 16 and 17 of bars 11 and 12 are co-planar. Bar 11 is wider than bar 12 whereby a bevelled setting face 18 formed thereon is exposed to view because edge face 19 of bar 11 is outwardly offset relative to edge face 20 of bar 12.

The bolts 13 have flat large diameter heads 25 with inner cam faces 26. Locknuts 27 are screwed on extending ends of bolts 13 and tightened against bar 12 to set these bolts to provide the proper degree of freedom of bar 11 to slide on these bolts between bolt heads 25 and bar 12.

Angled saw rests 28 are apertured to fit over the ends of bolts 13 and be adjustably mounted thereon by wing nuts 29.

Near the center of the clamp 10 and equidistant therefrom, aligned tapped holes 30 are provided in bars 11 and 12 into which holes flat headed screws 31 are screwed to rotatably mount angled clamp supports 32 thereon. These supports are adapted to rest on jaws 33 of a bench vise 34 to support the clamp 10 on said vise between said jaws and either with edge faces 19 and 20 upward (Fig. 3), or with edge faces 16 and 17 upward (Fig. 4).

Coiled expansion springs 35 are trapped in aligned holes bored through bar 12 and into bar 11 by Allen screws 40. Angled centering stops 41 have slots 42 through which screws 40 extend to adjustably position stops 41 so as to engage one of the jaws 33 of any particular vise 34 and centralize clamps 10 lengthwise relative to said vise.

The springs 35 constantly urge bars 11 and 12 apart to the limit of the freedom allowed them by bolts 13.

The vise 34 may be readily actuated to press bars 11 and 12 together on a section of a band saw 43 placed between said bars, as shown in Figs. 3 and 4, with the saw rests 28 adjusted, in either case, to support the saw at the proper level for setting or filing the saw teeth 44 as the case may be.

This clamping action may be assisted by cam levers 45 which are pivoted on bar 11 by Allen screws 46 and which have U-shaped notches 46 formed therein. Said levers, adjacent said notches, are bevelled so as to have a camming action on bolts 13 when levers 45 are swung to engage cam under-faces 26 of bolt heads 25.

Bolts 13 and cam levers 45 thus provide auxiliary devices 47 for clamping the saw 43 between end portions of the bars 11 and 12 after the middle portions of said bars have been pressed together on said saw by operation of the vise 34.

Operation

The first step in operating clamp 10 to set and file a saw 43 is to apply the clamp 10 to a vise 34 as shown in Figs. 1 and 2 with the stops 41 properly set to centralize the clamp 10 longitudinally in the vise 34 and with the saw rests 28 set to support the saw 43 with the base line of teeth 44 in the plane of edge face 20 of bar 12.

A section of the saw 43 is now introduced between bars 11 and 12 as shown in Figs. 1, 2 and 3 and resting on saw rests 28. The vise is now tightened to grip mid portions of bars 11 and 12 between jaws 33 thus tightly clamping saw 43 between said bars. This creates clearance between the bar 11 and bolt heads 25 which partially admits cam levers 45 which are now swung beneath said heads to actuate clamping devices 47 in perfecting the gripping of a section of saw 43 in clamp 10 preparatory to setting the teeth 44 of said section.

The setting operation may now be accomplished as by application of a set punch 48 (Fig. 3) to alternate teeth 44 individually to drive these teeeth against the bevelled setting face 18 of bar 11. When alternate teeth 44 of one such section of the saw 43 have thus been given a proper set, the vise 34 and devices 47 are loosened, the saw is advanced longitudinally to place an adjacent saw section between bars 11 and 12. This saw section is then gripped in the clamp 10 and alternate teeth thereof set as described for the preceding section.

After alternate teeth 44 of the entire saw 43 have thus been set, the saw is removed and inserted between bars 11 and 12 in reverse relation to its first position, after which the balance of the teeth 44 are set, section by section, as above described for the first half of said teeth.

The teeth setting operation completed, the saw is removed from clamp 10, the latter inverted and reintroduced between vise jaws 33 with supports 32 rotated 180° from their positions shown in Figs. 1, 2 and 3, and a section of saw 43 placed between bars 11 and 12 with saw rests 28 supporting said saw section as shown in Fig. 4 with the base line of teeth 44 in the plane of bar edge faces 16 and 17.

The saw section thus located is now gripped between bars 11 and 12, by tightening the vise 34 and devices 47, and the teeth 44 of said saw section are now sharpened by applying a file 49 to said teeth in the manner well known in the art. This operation is then repeated to sharpen teeth 44 of successive sections until all the teeth in the saw are sharpened.

While only one embodiment of the invention is disclosed, for purposes of illustration, it is to be understood that various modifications may be made in this without departing from the spirit of the invention or the scope of the appended claims.

The claims are:

1. In a band saw setting and filing clamp the combination of: a pair of jaw bars; a pair of bolts uniting said bars adjacent their opposite ends in parallel spaced relation for limited movement towards and away from each other; spring means urging said bars to their maximum spacing, said clamp being insertable between the jaws of a vise to shift said bars into clamping relation with a saw blade disposed between said bars; and supports provided on said bars which overlie said vise jaws, when said clamp is in use, to support said clamp on said vise, said supports being pivotally related to said bars and rotatable to rest on said vise jaws with said clamp in either of two horizontal positions with opposite bar edges turned upwardly, one of said bars being wider than the other and with one edge flush with the corresponding edge of the other bar, said one bar thus having one edge extending outward beyond the corresponding edge of the other bar, said extending edge being bevelled to the desired setting pitch of the teeth of said saw.

2. A combination as in claim 1 in which auxiliary manual means are provided near the ends of said clamp for clamping end portions of said bars together in gripping relation with said saw.

3. A combination as in claim 2 in which said auxiliary clamping means include said bolts; heads on said bolts having bevelled inside faces; and cam levers pivotally mounted on one of said bars, said levers being swingable beneath said bolt heads to draw said bar end portions together.

4. A combination as in claim 3 including saw rests adjustably mounted on extending threaded end portions of said bolts so that said rests may be adjusted to properly limit the downward insertion of a saw between said pair of bars with the latter in either of its two relatively inverted positions.

5. A combination as in claim 4 including vise jaw engaging members adjustably mounted for lengthwise adjustment on said bars to be set selectively to fit the jaws of any given vise and properly position said pair of bars in centered relation with said vise.

References Cited in the file of this patent

UNITED STATES PATENTS

| | | |
|---|---|---|
| 137,302 | Green | Apr. 1, 1873 |
| 155,819 | Weber | Oct. 13, 1874 |
| 232,463 | Cox | Sept. 21, 1880 |
| 1,651,263 | Fetters | Nov. 29, 1927 |
| 2,363,931 | Beard | Nov. 28, 1944 |
| 2,535,439 | McEwan | Dec. 26, 1950 |

FOREIGN PATENTS

| | | |
|---|---|---|
| 78,623 | Sweden | Oct. 20, 1932 |